(12) United States Patent
Kolman et al.

(10) Patent No.: US 9,699,196 B1
(45) Date of Patent: Jul. 4, 2017

(54) PROVIDING SECURITY TO AN ENTERPRISE VIA USER CLUSTERING

(71) Applicant: EMC Corporation, Hopkinton, MA (US)

(72) Inventors: Eyal Kolman, Tel Aviv (IL); Carmit Sahar, Tel Aviv (IL); Marcelo Blatt, Modiin (IL); Alon Kaufman, Herut (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 14/868,567

(22) Filed: Sep. 29, 2015

(51) Int. Cl.
*H04L 29/06* (2006.01)
*G06F 17/30* (2006.01)

(52) U.S. Cl.
CPC ...... *H04L 63/104* (2013.01); *G06F 17/30598* (2013.01); *G06F 17/30958* (2013.01); *H04L 63/08* (2013.01)

(58) Field of Classification Search
CPC . H04L 63/08; H04L 63/104; H04L 17/30598; H04L 17/30958; H04L 21/45
See application file for complete search history.

(56) References Cited

U.S. PATENT DOCUMENTS

| | | | |
|---|---|---|---|
| 8,954,358 B1* | 2/2015 | Zhang | G06K 9/6292 382/225 |
| 9,032,488 B2* | 5/2015 | Lee | G06F 21/31 709/217 |
| 9,092,599 B1* | 7/2015 | Kronrod | G06F 21/31 |
| 9,185,095 B1 | 11/2015 | Moritz et al. | |
| 9,262,533 B2 | 2/2016 | O'Donnell | |
| 9,367,872 B1 | 6/2016 | Visbal et al. | |
| 2012/0005284 A1* | 1/2012 | Tse | G06Q 10/10 709/206 |
| 2012/0263433 A1* | 10/2012 | Mei | G06Q 30/0276 386/241 |
| 2013/0030865 A1* | 1/2013 | Villaverde | G06Q 30/0201 705/7.29 |
| 2015/0095999 A1* | 4/2015 | Toth | H04L 63/08 726/6 |
| 2015/0278510 A1* | 10/2015 | Alexander | G06F 21/45 726/6 |
| 2016/0283071 A1* | 9/2016 | Bai | H04L 51/16 |
| 2016/0366074 A1* | 12/2016 | Bastide | H04L 51/04 |

* cited by examiner

*Primary Examiner* — Hadi Armouche
*Assistant Examiner* — Sher A Khan
(74) *Attorney, Agent, or Firm* — BainwoodHuang (57) ABSTRACT

A computer-implemented technique provides security to an enterprise. The technique involves receiving, by processing circuitry, personal information belonging to users of the enterprise. The technique further involves providing, by the processing circuitry, lists of user identifiers based on user relationships defined by the personal information. The lists of user identifiers respectively identify clusters of users of the enterprise. The technique further involves electronically imposing, by the processing circuitry, security classes on the clusters of users of the enterprise based on the lists of user identifiers. Along these lines, such classification can be used for risk assessment (e.g., authentication), alert filtering (e.g., filtering false alarms), and permission/privilege monitoring and/or assignment, among others.

20 Claims, 5 Drawing Sheets

PROVIDING SECURITY TO AN ENTERPRISE VIA USER CLUSTERING

BACKGROUND

A conventional approach to administering access privileges among employees within an organization involves manually setting the access privileges for each employee. For example, for a first employee in the human resources department of the organization, a human administrator may provide that employee with special privileges to access the organization's personnel records but no privileges to access the organization's financial information. Likewise, for a second employee in the accounting department of the organization, the human administrator may provide that employee with special privileges to access the organization's financial information but no privileges to access the organization's personnel records.

Additionally, suppose that the first employee transfers from the human resources department to the finance department (i.e., switches jobs). In this situation, the human administrator manually removes the first employee's special privileges to access the organization's personnel records and grants the first employee with special privileges to access the organization's financial information.

SUMMARY

Unfortunately, there are deficiencies to the above-described conventional approach to manually administering access privileges among employees within an organization. For example, such manual access privilege control requires skill and is burdensome on the human administrator (i.e., takes expertise and time). Additionally, such manual access privilege control is vulnerable to human error. Furthermore, as employees switch jobs within the organization, the existing privileges may quickly become outdated if not vigilantly maintained.

In contrast to the above-described conventional approach to manually administering access privileges among employees of an organization, improved techniques are directed to providing security to an enterprise via clustering of users. In particular, such techniques involve identifying clusters of users of an enterprise based on personal information (e.g., email communications, co-attendance information in meeting data, etc.) and electronically imposing security classes on the clusters of users based on such identification. Such techniques can be automated to alleviate manual burden on humans and reduce the likelihood of human error. Additionally, such techniques can be performed in an ongoing manner to dynamically adjust as new clusters emerge and existing clusters disband. Along these lines, such classification can be used for risk assessment (e.g., authentication), alert filtering (e.g., filtering false alarms), permission/privilege monitoring and/or assignment, and so on.

One embodiment is directed to a computer-implemented method of providing security to an enterprise. The method includes receiving, by processing circuitry, personal information belonging to users of the enterprise. The method further includes providing, by the processing circuitry, lists of user identifiers based on user relationships defined by the personal information. The lists of user identifiers respectively identify clusters of users of the enterprise. The method further includes electronically imposing, by the processing circuitry, security classes on the clusters of users of the enterprise based on the lists of user identifiers.

In some arrangements, receiving the personal information belonging to users of the enterprise includes obtaining user data from electronic personal information managers operated by the users of the enterprise. Here, providing the lists of user identifiers based on the user relationships defined by the personal information may include (i) identifying clusters of users from the user data obtained from the electronic personal information managers, and (ii) outputting the lists of user identifiers to reflect the clusters of users identified from the user data.

In some arrangements, the user data obtained from the electronic personal information managers includes email communications processed by email circuitry operated by the users of the enterprise. In these arrangements, identifying the clusters of users from the user data includes, based on the email communications, generating a vertex-edge graph having vertexes and edges connecting the vertexes. Each vertex represent a user of the enterprise. Additionally, each edge represents a relationship (e.g., multi-dimensional weights) between multiple users. In these arrangements, identifying further includes performing a set of pruning operations on the vertex-edge graph to derive the clusters of users.

In some arrangements, the user data obtained from the electronic personal information managers includes meeting processed by calendaring circuitry operated by the users of the enterprise. In these arrangements, identifying the clusters of users from the user data includes, based on co-attendance information in the meeting data, generating a vertex-edge graph having vertexes and edges connecting the vertexes.

In some arrangements, a same user of the enterprise belongs to at least two clusters. That is, the same user can be a member of several groups reflecting standard working relationships.

In some arrangements, electronically imposing the security classes on the clusters of users of the enterprise based on the lists of user identifiers includes forming a behavior profile based on collected user behavior of users of a particular cluster, and providing a risk score, i.e., a numerical measure of riskiness that the human is an imposter. The risk score can be based on a comparison of (i) current behavior of a human purporting to be a user of the particular cluster to (ii) the behavior profile.

In some arrangements, electronically imposing the security classes on the clusters of users of the enterprise based on the lists of user identifiers includes forming an alarm filter based on collected alarm behavior from users of a particular cluster. The alarm filter is then applied to new alarms arising from user activity by a user of the particular cluster to remove false alarms.

In some arrangements, electronically imposing the security classes on the clusters of users of the enterprise based on the lists of user identifiers includes identifying a consensus set of permissions based on collected permissions of users of a particular cluster. Each permission defines a level of access control for a particular computerized resource of the enterprise. In these arrangements, electronically imposing the security classes further includes adjusting an existing set of permissions for a user of the particular cluster based on a comparison of the existing set of permissions to the consensus set of permissions.

Another embodiment is directed to electronic equipment which includes memory and control circuitry coupled to the memory. The memory stores instructions which, when carried out by the control circuitry, cause the control circuitry to:

(A) receive personal information belonging to users of the enterprise;
(B) provide lists of user identifiers based on user relationships defined by the personal information, the lists of user identifiers respectively identifying clusters of users of the enterprise; and
(C) electronically impose security classes on the clusters of users of the enterprise based on the lists of user identifiers.

Yet another embodiment is directed to a computer program product having a non-transitory computer readable medium which stores a set of instructions to provide security to an enterprise. The set of instructions, when carried out by computerized circuitry, causing the computerized circuitry to perform a method of:
(A) receiving personal information belonging to users of the enterprise;
(B) providing lists of user identifiers based on user relationships defined by the personal information, the lists of user identifiers respectively identifying clusters of users of the enterprise; and
(C) imposing security classes on the clusters of users of the enterprise based on the lists of user identifiers.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing security to an enterprise via user clustering.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to providing security to an enterprise via user clustering. In particular, such a technique involves identifying clusters of users of the enterprise based on personal information (e.g., email communications, co-attendance information in meeting data, etc.) and electronically imposing security classes on the clusters of users based on such identification. Such techniques can be automated to alleviate the manual burden on humans and to reduce the likelihood of human error. Additionally, such techniques can be performed in an ongoing manner to dynamically adjust as new clusters of users emerge and existing clusters of users disband. Along these lines, such security classification can be used for risk assessment (e.g., authentication), alert filtering (e.g., filtering false alarms), permission/privilege monitoring and/or assignment, and so on.

Figure 1:
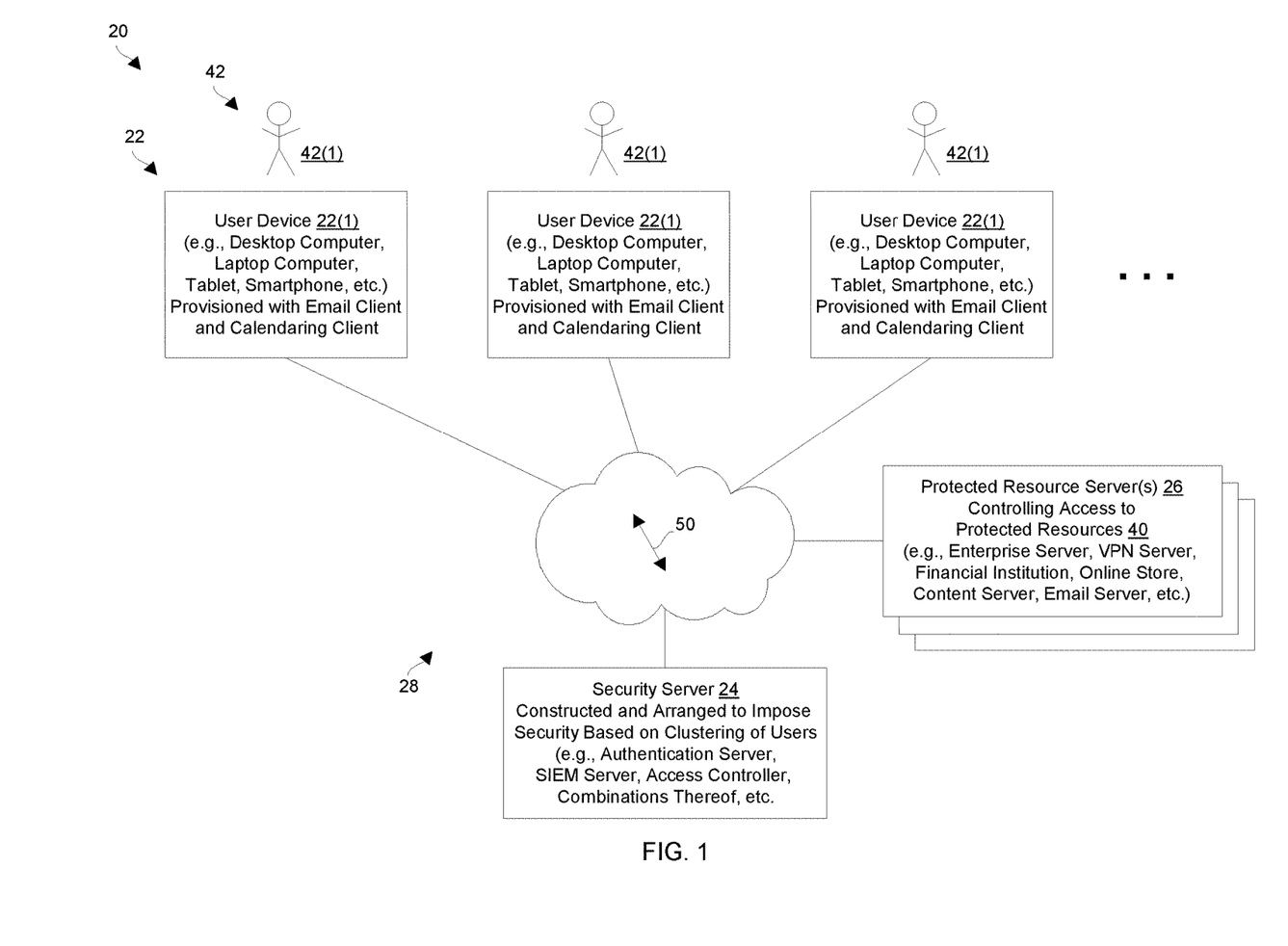
FIG. 1 is a block diagram of an electronic environment which provides security based on clustering of users.

FIG. 1 is a block diagram of an electronic environment 20 which provides security based on clustering of users. The electronic environment 20 includes user devices 22(1), 22(2), 22(3), . . . (collectively, user devices 22), a security server 24, protected resource servers 26, and a communications medium 28.

Each user device 22 is constructed and arranged to perform useful work on behalf of a respective user 30. Along these lines, each user device 22 is provisioned with, among other things, an email client for sending and receiving email messages, and a calendaring client for scheduling meetings and responding to meeting invitations. Other user-level features are available as well (e.g., document editing, content accessing, network browsing, transaction completing, etc.). As shown in FIG. 1, a user 30(1) controls and operates user device 22(1), a user 30(2) controls and operates user device 22(2), a user 30(3) controls and operates user device 22(3), and so on. Examples of suitable user devices 22 include workstations, desktop computers, laptops, tablet devices, smart phones, and the like.

The security server 24 is constructed and arranged to impose security based on clustering of the users 30. The security server 24 may be configured to perform authentication, security information and event management (SIEM), access control based on privileges, combinations thereof, and so on. Further details of the operation of the security server 24 will be provided shortly.

The protected resource servers 26 are constructed and arranged to provide access to protected resources 40 based on security instructions/signaling from the security server 24. Such protected resources 40 are capable of being accessed remotely by the user devices 22 following successful authentication with the security server 24 and/or upon granting of particular permissions/privileges to the users 30. Examples of suitable remote protected resources 40 include (among others) accounts and databases of enterprises, VPNs/gateways/other networks, content access, file access, transaction access, and so on.

The communications medium 28 is constructed and arranged to connect the various components of the electronic environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the user devices 22 operate on behalf of their respective users 30 to perform useful work. For example, the user devices 22 send and receive email messages thus enabling the users 30 to communicate remotely in a well-documented manner. During such operation, the email communications (e.g., messages, metadata, etc.) may be accessed by the security server 24 to identify clusters of users 30. Such email communications may reside locally on each user device 22, centrally in an email server, or in both locations.

Additionally, the user devices 22 coordinate meetings on behalf of the users 30, e.g., send out meeting invitations the user devices 22 of other users 30 to schedule meetings, accept or reject meeting invitations from other users 30, etc. During such operation, the meeting data of the users 30 (e.g., schedules, calendar entries, etc.) may be accessed by the security server 24 to identify clusters of users 30. Again, such meeting data may reside locally on each user device 22, centrally in a calendar server, or in both locations.

Periodically, the security server 24 identifies clusters of similar users 30 based on the email communications, the meeting data, and/or additional work-related data. In particular, the security server 24 is able to apply analytics to identify groups of similar users 30 based on who is regularly communicating with who via email, who is meeting with who via meeting invitations, and so on. In contrast to traditional access control in which a human administrator modifies access privileges based on an employee's current position or title in a company (e.g., based on the organizational chart, company hierarchy, corporate tree, etc.), such clustering of similar users 30 based on analytics enables the security server 24 to detect groups of similar users 30 that form or emerge dynamically and that change over time. Accordingly, the security server 24 is able to make security adjustments faster without waiting for the user's position or title within the company to be formally updated. Further details will now be provided with reference to FIG. 2.

Figure 2:
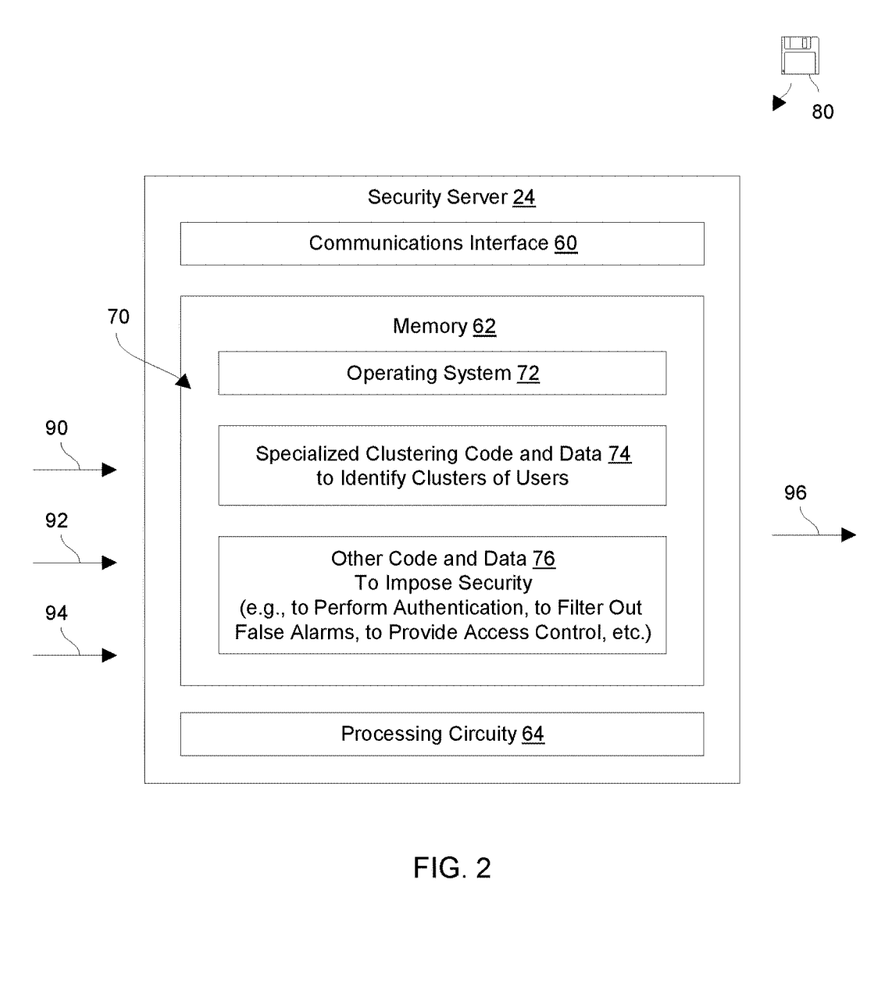
FIG. 2 is a block diagram of a security server of the electronic environment of FIG. 1.

FIG. 2 shows particular details of the security server 24 of the electronic environment 20 (also see FIG. 1). The security server 24 includes a communications interface 60, memory 62, and processing circuitry 64.

The communications interface 60 is constructed and arranged to connect the security server 24 to the communications medium 26 (also see FIG. 1) to enable communications with other devices of the electronic environment 20 (e.g., the user devices 22, the protected resource servers 26, etc.). Such communications may be IP-based, SAN-based, cellular-based, cable-based, fiber-optic based, wireless, combinations thereof, and so on. Accordingly, the communications interface 60 enables the security server 24 to robustly and reliably communicate with other external apparatus of the electronic environment 20.

The memory 62 is intended to represent both volatile storage (e.g., DRAM, SRAM, etc.) and non-volatile storage (e.g., flash memory, magnetic memory, etc.). The memory 62 stores a variety of software constructs 70 including an operating system 72, specialized clustering code and data 74, and other code and data 76. The operating system includes a kernel to manage computerized resources (e.g., processor cycles, memory space, etc.), drivers (e.g., for an I/O stack), tools and utilities (e.g., for administration) and so on. The specialized clustering code and data 74 enables the security server 24 to identify clusters of similar users 30. The other code and data 76 enables the security server 24 to impose various types of security based on the identified clusters of similar users 30 (e.g., perform authentication, filter out false alarms, provide access control, and so on).

The processing circuitry 64 is constructed and arranged to operate in accordance with the various software constructs 70 stored in the memory 62, i.e., to execute code of the various software constructs to perform useful work. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the security server 24. In particular, the computer program product 80 has a non-transitory (or non-volatile) computer readable medium which stores a set of instructions which controls one or more operations of the security server 24. Examples of suitable computer readable storage media include tangible articles of manufacture and apparatus which store instructions in a non-volatile manner such as CD-ROM, flash memory, disk memory, tape memory, and the like.

During operation, the security server 24 obtains access to email data 90 and/or meeting data 92 resulting from email communications and scheduled meetings between and among the users 30. It should be understood that other types of data 94 are suitable for use as well (e.g., text messages, chat messages, file sharing metadata, and the like). As mentioned earlier, such data 90, 92, 94 may be stored centrally (e.g., by email servers, meeting servers, etc.) or in a distributed manner (e.g., locally on each user device 22).

The security server 24 analyzes the data 90, 92, 94 and outputs lists (or databases) 96 of users 30. Each list 96 identifies users 30 which have certain things in common (e.g., routinely receive the same emails, routinely attend the same meetings, etc.). With such lists 96, the security server 24 is then able to impose one or more types of security based on the lists 96 (e.g., authentication, alarm filtering, permissions, etc.). The following example use cases are provided to illustrate certain advantages of the improved techniques.

Risk Assessment

In some arrangements, the security server 24 operates as an authentication server that performs risk-based or adaptive authentication to authenticate users 30 of an enterprise. That is, when a human purporting to be a particular user 30 attempts to authenticate with the security server, the security server 24 collects a current assortment of authentication factors (e.g., time of day, browser settings, resources to be accessed, etc.) and compares that current assortment to an individual behavior profile for that particular user 30. The authentication server must then signal successful authentication to a protected resource server 26 before the protected resource server 26 is allowed to provide the user 30 access to a protected resource 40. The individual behavior profile is based on previous authentication attempts by that particular user 30 (e.g., previous times of day, previous browser settings, previous resources, etc.).

However, with the lists 96 of similar users 30 now available (also see FIG. 2), the security server 24 is able to automatically augment its risk assessment abilities. In particular, the security server 24 is able to automatically generate a cluster behavior profile for each list (or cluster) 96 of similar users 30. Such a cluster behavior profile reflects user habits of all of the users 30 on a particular list 96 such as the usual time of day that those users 30 login to their accounts, the particular databases and file systems that those users 30 typically access, the particular programs that those users 30 typically run, the websites that those users 30 typically access, and so on.

Now, suppose that a new user 30 joins a particular cluster of similar users 30 (e.g., a new employee joins the finance department). At first, the security server 24 does not have any information about the new user 30. Nevertheless, the security server 24 is able to identify the particular list 96 that includes the new user 30, and then compare a current assortment of authentication factors from the new user 30 to the cluster behavior profile to perform risk-based authentication on the new user 30. Here, the risk assigned is still based on how regular or anomalous the user's current behavior is compared to the historical behavior of the other users 30 on the list 96 (e.g., do the behavioral habits of the new employee in the finance department match those of the other finance department employees?).

In some arrangements, risk-based authentication may involve comparison of current authentication factors to both a user's individual behavior profile as well as to one or more cluster behavior profiles for which the particular user 30 is listed. That is, the security server 24 generates a risk score (i.e., a numerical measure of riskiness that a human purporting to be the user 30 is an imposter) based on these comparisons. The security server 24 deems authentication successful when the risk score is lower than a predefined risk threshold, and deems authentication unsuccessful when the risk score is higher than the predefined risk threshold.

Filtering False Alerts

In some arrangements, the security server 24 operates as a security information and event management (SIEM) system. In particular, the security server 24 identifies high risk events/activities to an administrator (e.g., a skilled security officer) of the enterprise by issuing alerts.

Along these lines, suppose that a group of similar users 30 (e.g., engineers) from the enterprise visit a conference or special meeting at an uncommon location (e.g., in another state or in another country) and attempt to access the enterprise's virtual private network (VPN) from the uncommon location. Since several users 30 of the group appear in the uncommon location, it is likely that the users 30 are visiting and that the VPN access events are not risky events that need to be identified to the administrator. In such a situation, the security server 24 uses the information regarding the uncommon location of the users 30 (e.g., collected alarm behavior from the cluster of visiting users 30) to form an alarm filter. The security server 24 then applies the alarm filter out to new alarms arising from activity of the visiting users 30 and thus remove false alarms.

As another example, suppose that the user credentials for a particular user 30 appear on a new user device 22. If the new user device 22 is not recognized by the security server 24, this situation may be risky. However, if the new user device 22 is recognized by the security server 24 as belonging to another user 30 in the same department (e.g., due to clustering of users 30), the security server 24 may consider this situation to be less risky (e.g., the amount of risk viewed by the security server 24 should be reduced).

Permission Monitoring and/or Adjusting

In some arrangements, the security server 24 operates as an access control server, and the security server 24 automatically identifies permission/privilege discrepancies in a list 96 (or cluster) of similar users 30. Here, it is expected that the users 30 on the same list 96 or in the same cluster will have similar permissions/privileges to access company resources (e.g., servers, databases, etc.). That is, the security server 24 generates a consensus set of permissions for a list 96 of users 30. Accordingly, if the security server 24 detects that a listed user 30 has a permission to a specific resource that the other listed users 30 do not have, it is quite possible that the permission (e.g., a level of access control for a particular computerized resource of the enterprise) is obsolete and should be canceled.

For example, suppose that a user 30 previously possessed a particular high security permission to access a restricted file while working in a particular department within an enterprise. However, since the user 30 has transferred to a new department within the enterprise, the particular permission is no longer needed. In such a situation, the security server 24 can automatically adjust the permissions (e.g., cancel the no longer needed high security permission). Alternatively, the security server 24 can notify a human administrator of detected permission discrepancy and prompt the human administrator to either accept or reject an update to that user's permissions.

Accordingly, access control based on clustering of users 30 is dynamic and up-to-date. Such security control is able to occur quickly and accurately regardless of whether the enterprise has formally updated the enterprise's org chart or human resources table.

Further Details

Figure 3:
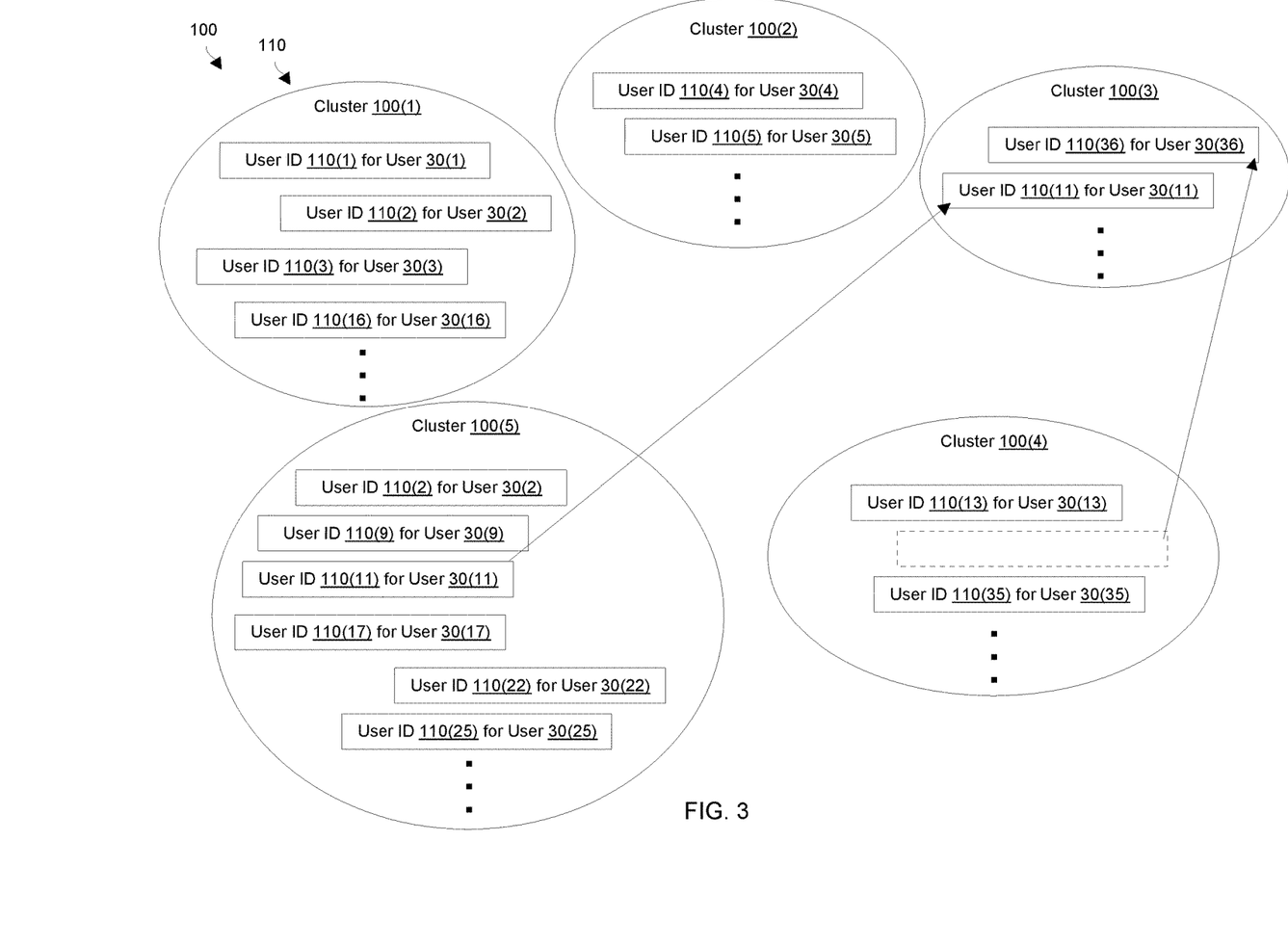
FIG. 3 is a general diagram illustrating an example set of user clusters.

FIG. 3 illustrates an example set of user clusters 100(1), 100(2), 100(3), 100(4), 100(5), 100(6) (collectively, clusters 100) which has been derived by the security server 24 via a clustering (or grouping) process involving the application of analytics to personal information of users 30 of an enterprise. Such personal information may include work-related email communications, meeting data, other collaborative information (e.g., text message data, chat message data, etc.), combinations thereof, and the like.

As will be described shortly, the applied analytics identify these clusters 100 based on a variety of criteria which reflects the working relationships or interaction among the users 30 (e.g., frequency of emails, length/depth of meetings, email or meeting context, etc.). Accordingly, it should be appreciated that the work performed by the users 30 within the same cluster 100 is likely related and should be handled similarly from a security perspective (e.g., share the same enterprise resources, require the same permissions, perform similar roles, etc.).

Furthermore, it should be appreciated that such clusters 100 are not static. Rather, based on evolving working relationships within the enterprise, new clusters 100 may emerge while other clusters 100 disband.

By way of example, the security server 24 has identified six clusters 100 of users 30. Each cluster 100 includes multiple users 30 which are identified by respective user identifiers (IDs) 110, i.e., each user ID uniquely identifies a particular user 30. In this example, the cluster 100(A) includes similar users 30(1), 30(2), 30(3), 3(16), . . . as identified by user IDs 110(1), 110(2), 110(3), 110(16), . . . . Likewise, the cluster 100(B) includes similar users 30(4), 30(5), . . . as identified by user IDs 110(4), 110(5), . . . , and so on.

In this example, it is quite possible that the users 30 of the cluster 100(1) work in the same department (or on the same project) with each other (e.g., an engineering group, a finance department, etc.), and similarly other users 30 of the other clusters 100 work together in other departments. Over time, these working relationships may change thus warranting changes in the clusters 100. For example, as the security server 24 processes new personal information to modify or update the clusters 100, the security server 24 may determine that a particular user 30 should no longer belong to a cluster 100 or should be moved from one cluster 100 to another cluster 100. Along these lines, FIG. 3 shows that user 30(36) should be moved from the cluster 100(4) to the cluster 100(3) (e.g., perhaps due to completion of a first project and the start of a new project by the users 30(36)).

Moreover, it should be understood that a user 30 is not restricted to just one cluster 100. Rather, a user 30 may belong to multiple clusters 100 (e.g., user 30(2) belongs to both cluster 100(1) and cluster 100(5)). Also, the security server 24 maintains the user 30(11) in the cluster 100(5) and adds the user 30(11) to the cluster 100(3) (e.g., perhaps due to emerging commonality with the user 30(11) and other users 30 of the cluster 100(3)).

Furthermore, it should be understood that new users 30 to the enterprise may join one or more clusters 100. Similarly, users 30 leaving the enterprise may simply leave the clusters 100. Further details will now be provided with reference to FIG. 4.

Figure 4:
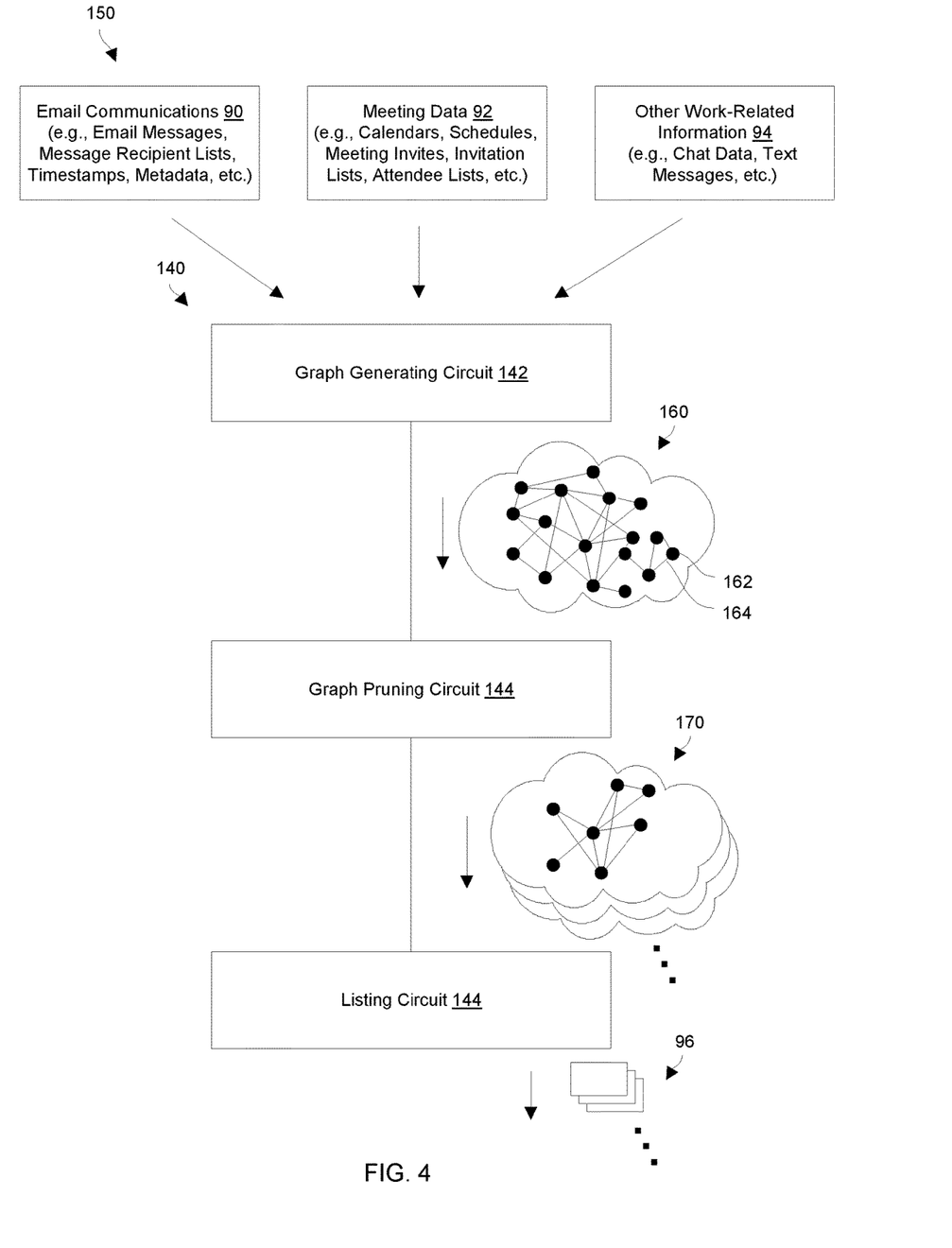
FIG. 4 is a general diagram illustrating a suitable clustering process.

FIG. 4 shows a process (e.g., specialized big data analytics) which is performed by circuitry 140 of the security server 24 to identify clusters 100 of similar users 30 (also see FIG. 3). The circuitry 140 includes a graph generating circuit 142, a graph pruning circuit 144, and a listing circuit 146 which are arranged in stages or a pipeline. That is, output from the graph generating circuit 142 is input to the graph pruning circuit 144, and output from the graph pruning circuit 144 is input to the listing circuit 146. Such circuitry 140 may be formed by the processing circuitry 64 of the security server 24 executing in accordance with the specialized clustering code and data 74 (also see FIG. 2).

In greater detail, the input to the graph generating circuit 142 includes work related personal information 150 for the users 30 of an enterprise such as email communications 90 (e.g., email messages, message recipient lists, timestamps, metadata, etc.), meeting data 92 (e.g., calendars, schedules, meeting invites, invite lists, meeting attendee lists, etc.), and/or other work-related information 94 (e.g., chat data, text message data, etc.). The graph generating circuit 142 generates and outputs a vertex-edge (or relational) graph 160 based on this work related personal information 150. Each vertex 162 of the graph 160 represents a user 30 of the enterprise (e.g., via user ID) and each edge 164 representing a relationship between multiple users 30 (e.g., via a multi-dimension weight). One should appreciate that such a graph 160 may be instantiated in the form of a complex data structure, a database, data within a file, and so on.

In arrangements using the email communications 90 as input, the edges 164 include weights having strength values reflecting various information within the email communications 90. Along these lines, the graph generating circuit 142 can extract sender information, recipient information (e.g., whether the recipient is the specific addressee, cc'd, bcc'd, whether the message was sent to a distribution list, etc.), timestamps, other email metadata (e.g., whether messages are forwarded or replies, whether messages are marked urgent or high priority, etc.), and so on. Accordingly, the extracted information provides an indication how closely the users 30 interact with each other, and the nature/context/etc. of such interactions.

Likewise, in arrangements using the meeting data 92 as input, the edges 164 include weights having strength values reflecting various information within the meeting data 92. Along these lines, the graph generating circuit 142 can extract information such as the meeting organizer, attendee information (e.g., whether the attendees are required participants or optional attendees, etc.), attendance information (e.g., whether the users 30 attended in person, online/remotely, etc.), which mailing lists each attendee belongs to, and so on. Again, such information provides an indication how closely the users 30 interact with each other, and the nature/context/etc. of such interactions.

When providing the edge weights, the graph generating circuit 142 performs feature extraction operations (e.g., identification of features that reflect the behavior of the users 30 and/or groups of users 30). Along these lines, the graph generating circuit 142 evaluates the input data and provides edge weights based on the number of email messages or meetings between users 30, correlations between user 30 (e.g., if user A is recipient/attendee, what is the probability that user B is also a recipient/attendee, etc.), the amounts of time between email messages/meetings, the percentage of emails that are replied to, the number of recipients on each message, meeting frequency and duration, the amount of time between scheduling a meeting and holding the meeting, how a meeting invitee responds to an invite (e.g., accept, tentative, decline, etc.), the amount of email messages following a meeting, combinations thereof, and so on.

It should be understood that the edge weights ultimately reflect the similarity between users 30 (e.g., users 30 that communicate a lot with each other via email and/or meeting attendance have a high similarity). In other arrangements, the graph generating circuit 142 inputs and processes both the email communications 90 and the meeting data 92 to generate the graph 160. In some arrangements, other information 94 is input and processed as well (FIG. 4).

The graph pruning circuit 144 takes the graph 160 from the graph generating circuit 142 performs a set of pruning operations on the graph 160. The set of pruning operations forms a set of pruned graphs 170 from the original vertex-edge graph 160. In particular, the set of pruning operations processes the original vertex-edge graph 160 (e.g., compares relationship strengths, removes vertexes and/or edges based on such comparisons, etc.) to derive the smaller pruned graphs 170. Such pruning operations may include filtering, sorting, deleting, etc. based on individual edge weight comparisons, aggregated edge weight comparisons, etc. Additionally, such comparisons may be with other edge weights, average edge weights, predefined weight thresholds, combinations thereof, and so on. The graph pruning circuit 144 then provides the set of pruned graphs 170 to the listing circuit 144.

The listing circuit 144 generates lists 96 of similar users 30 based on the set of pruned graphs 170 (also see FIG. 2). In particular, each pruned graph 170 represents a cluster 100 of similar users 30 (also see FIG. 3). The listing circuit 144 outputs the lists 96 of similar users 30 (e.g., sets of user IDs 110) for use in security by the security server 24 (also see FIG. 3). As mentioned earlier, suitable example use cases include risk assessment, reduction of false alarms, and permission control, among others. Further details will now be provided with reference to FIG. 5.

Figure 5:
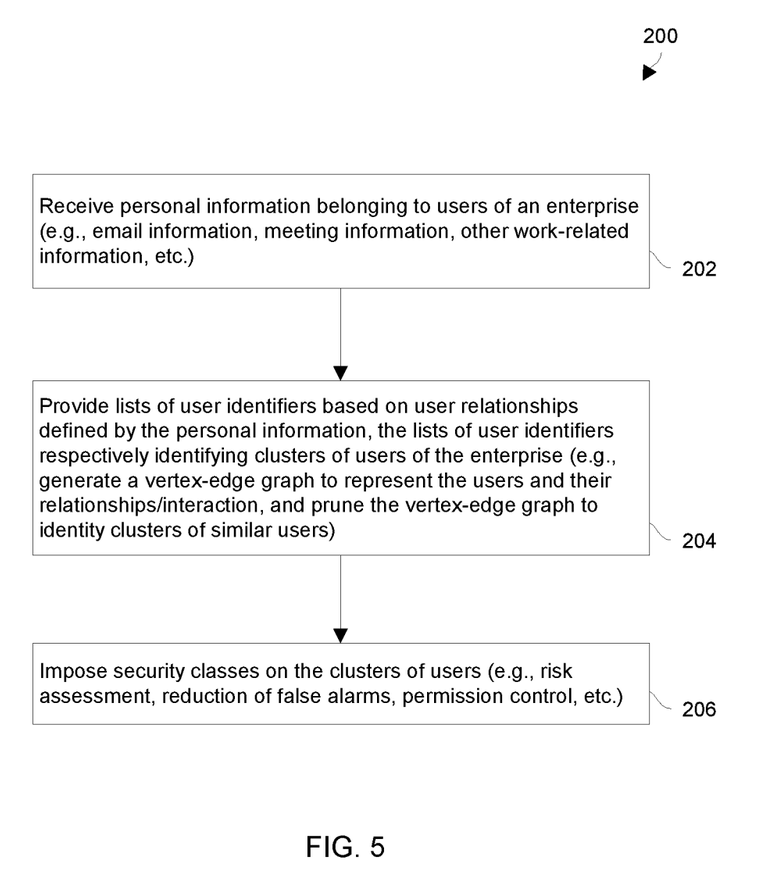
FIG. 5 is a flowchart of a procedure which is performed by the security server of FIG. 2.

FIG. 5 is a flowchart of a procedure 200 which is performed by the security server 24 to provide security to an enterprise (also see FIG. 2). At 202, circuitry of the security server 24 receives personal information 150 (e.g., email information, meeting information, other work-related information, etc.) belonging to users 30 of the enterprise (FIG. 4).

At 204, the circuitry of the security server 24 provides lists 96 of user identifiers 110 based on user relationships defined by the personal information 150. For example, the circuitry generates a vertex-edge graph 160 where users 30 are represented by vertexes 162, and user relationships/interactions are represented by edges 164. The circuitry then prunes the vertex-edge graph 160 (e.g., filters out the weaker relationships) to identify user similarity. The lists 96 of user identifiers 110 respectively identify clusters 100 of similar users 30 of the enterprise (FIG. 3).

At 206, the circuitry of the security server 24 electronically imposes security classes on clusters 100 of similar users 30 of the enterprise based on the lists 96 of user identifiers 110. Examples include using the clusters 100 as input for risk assessment, for reducing false alarms, and for controlling permissions. Other examples are suitable for use as well.

As described above, improved techniques are directed to providing security to an enterprise via clustering of users 30. In particular, such techniques involve identifying clusters of users 30 of an enterprise based on personal information 150 (e.g., email communications, co-attendance information in meeting data, etc.) and electronically imposing security classes on the clusters 100 of users 30 based on such identification. Such techniques can be automated to alleviate manual burden on humans and reduce the likelihood of human error. Additionally, such techniques can be performed in an ongoing manner to dynamically adjust as new clusters 100 emerge and existing clusters 100 disband. Along these lines, such classification can be used for risk assessment (e.g., authentication), alert filtering (e.g., filtering false alarms), permission/privilege monitoring and/or assignment, and so on.

One should appreciate that the above-described techniques do not merely process user information to impose security. Rather, the disclosed techniques involve providing security to an enterprise via identification of clusters 100 of similar users 30. In some arrangements, such cluster identification is carried out by representing the users 30 and their relationships/interactions via a vertex-edge graph 160, and then pruning the graph 160. With the above-described techniques, other advantages are available as well such as automation, reducing the likelihood of human error, updating security dynamically rather than waiting for formal changes to an org chart or human resource records, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the security server 24 or portions thereof, the protected resource servers 26, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

As mentioned above, the security server 24 performs a data-drive process of dynamically generating clusters/groups of related people. Such a process may be particularly well-suited when traditional forms of input such as organization charts and human resource tables/records are not fully updated or do not fully reflect collaboration among members of an enterprise. In particular, the security server 24 is able to address dynamic groups of employees from different departments that work on a common project (e.g., a researcher from the Chief Technology Office, a developer from Research and Development, a project manager, a technical writer, and so on). Such an ad hoc group may require common security treatment even though the group is not documented anywhere. Fortunately, the analytic and adaptive nature of the security server 24 enables the security server to identify and handle security for such a group. Such modifications and enhancements are intended to belong to various embodiments of the disclosure.

What is claimed is:

1. A computer-implemented method of providing security to an enterprise, the method comprising:
receiving, by processing circuitry, personal information belonging to users of the enterprise;
providing, by the processing circuitry, lists of user identifiers based on user relationships defined by the personal information, the lists of user identifiers respectively identifying clusters of users of the enterprise; and
electronically imposing, by the processing circuitry, security classes on the clusters of users of the enterprise based on the lists of user identifiers;
wherein receiving the personal information belonging to users of the enterprise includes:
obtaining user data from electronic personal information managers operated by the users of the enterprise;
wherein providing the lists of user identifiers based on the user relationships defined by the personal information includes:
identifying clusters of users from the user data obtained from the electronic personal information managers, and
outputting the lists of user identifiers to reflect the clusters of users identified from the user data;
wherein the user data obtained from the electronic personal information managers includes email communications processed by email circuitry operated by the users of the enterprise;
wherein identifying the clusters of users from the user data includes:
based on the email communications, generating a vertex-edge graph having vertexes and edges connecting the vertexes, each vertex representing a user of the enterprise and each edge representing a relationship between multiple users, and
performing a set of pruning operations on the vertex-edge graph to derive the clusters of users;
wherein generating the vertex-edge graph includes providing, to each edge, a weight having a relationship strength value which is based on analytics performed on the email communications; and
wherein performing the set of pruning operations on the vertex-edge graph includes identifying groups of vertexes based on the relationship strength value of the weight of each edge.

2. A computer-implemented method as in claim 1 wherein the user data obtained from the electronic personal information managers further includes meeting data processed by calendaring circuitry operated by the users of the enterprise; and wherein:
 the vertex-edge graph is further generated based on co-attendance information in the meeting data.

3. A computer-implemented method as in claim 2 wherein generating the vertex-edge graph further includes providing, to each edge, a weight having a relationship strength value which is based on analytics performed on the co-attendance information in the meeting data.

4. A computer-implemented method as in claim 1 wherein a same user of the enterprise belongs to at least two clusters.

5. A computer-implemented method as in claim 1 wherein electronically imposing the security classes on the clusters of users of the enterprise based on the lists of user identifiers includes:
 forming a behavior profile based on collected user behavior of users of a particular cluster, and
 providing a risk score based on a comparison of (i) current behavior of a human purporting to be a user of the particular cluster to (ii) the behavior profile, the risk score being a numerical measure of riskiness that the human is an imposter.

6. A computer-implemented method as in claim 1 wherein electronically imposing the security classes on the clusters of users of the enterprise based on the lists of user identifiers includes:
 forming an alarm filter based on collected alarm behavior from users of a particular cluster, and
 applying the alarm filter to new alarms arising from user activity by a user of the particular cluster to remove false alarms.

7. A computer-implemented method as in claim 1 wherein electronically imposing the security classes on the clusters of users of the enterprise based on the lists of user identifiers includes:
 identifying a consensus set of permissions based on collected permissions of users of a particular cluster, each permission defining a level of access control for a particular computerized resource of the enterprise, and
 adjusting an existing set of permissions for a user of the particular cluster based on a comparison of the existing set of permissions to the consensus set of permissions.

8. Electronic equipment, comprising:
 memory; and
 control circuitry coupled to the memory, the memory storing instructions which, when carried out by the control circuitry, cause the control circuitry to:
  receive personal information belonging to users of the enterprise;
  provide lists of user identifiers based on user relationships defined by the personal information, the lists of user identifiers respectively identifying clusters of users of the enterprise; and
  electronically impose security classes on the clusters of users of the enterprise based on the lists of user identifiers;
 wherein the control circuitry, when receiving the personal information belonging to users of the enterprise, is constructed and arranged to:
  obtain user data from electronic personal information managers operated by the users of the enterprise;
 wherein the control circuitry, when providing the lists of user identifiers based on the user relationships defined by the personal information, is constructed and arranged to:
  identify clusters of users from the user data obtained from the electronic personal information managers, and
  output the lists of user identifiers to reflect the clusters of users identified from the user data;
 wherein the user data obtained from the electronic personal information managers includes email communications processed by email circuitry operated by the users of the enterprise;
 wherein the control circuitry, when identifying the clusters of users from the user data, is constructed and arranged to:
  based on the email communications, generate a vertex-edge graph having vertexes and edges connecting the vertexes, each vertex representing a user of the enterprise and each edge representing a relationship between multiple users, and
  perform a set of pruning operations on the vertex-edge graph to derive the clusters of users;
 wherein the control circuitry, when generating the vertex-edge graph, is constructed and arranged to:
  provide, to each edge, a weight having a relationship strength value which is based on analytics performed on the email communications; and
 wherein the control circuitry, when performing the set of pruning operations on the vertex-edge graph, is constructed and arranged to:
  identify groups of vertexes based on the relationship strength value of the weight of each edge.

9. Electronic equipment as in claim 8 wherein the control circuitry, when electronically imposing the security classes on the clusters of users of the enterprise based on the lists of user identifiers, is constructed and arranged to:
 identify a consensus set of permissions based on collected permissions of users of a particular cluster, each permission defining a level of access control for a particular computerized resource of the enterprise, and
 adjust an existing set of permissions for a user of the particular cluster based on a comparison of the existing set of permissions to the consensus set of permissions.

10. A computer program product having a non-transitory computer readable medium which stores a set of instructions to provide security to an enterprise, the set of instructions, when carried out by computerized circuitry, causing the computerized circuitry to perform a method of:
 receiving personal information belonging to users of the enterprise;
 providing lists of user identifiers based on user relationships defined by the personal information, the lists of user identifiers respectively identifying clusters of users of the enterprise; and
 imposing security classes on the clusters of users of the enterprise based on the lists of user identifiers;
wherein receiving the personal information belonging to users of the enterprise includes:
 obtaining user data from electronic personal information managers operated by the users of the enterprise;
wherein providing the lists of user identifiers based on the user relationships defined by the personal information includes:
 identifying clusters of users from the user data obtained from the electronic personal information managers, and outputting the lists of user identifiers to reflect the clusters of users identified from the user data;
wherein the user data obtained from the electronic personal information managers includes email communications processed by email circuitry operated by the users of the enterprise;
wherein identifying the clusters of users from the user data includes:
   based on the email communications, generating a vertex-edge graph having vertexes and edges connecting the vertexes, each vertex representing a user of the enterprise and each edge representing a relationship between multiple users, and
   performing a set of pruning operations on the vertex-edge graph to derive the clusters of users;
wherein generating the vertex-edge graph includes providing, to each edge, a weight having a relationship strength value which is based on analytics performed on the email communications; and
wherein performing the set of pruning operations on the vertex-edge graph includes identifying groups of vertexes based on the relationship strength value of the weight of each edge.

11. A computer program product as in claim 10 wherein electronically imposing the security classes on the clusters of users of the enterprise based on the lists of user identifiers includes:
   identifying a consensus set of permissions based on collected permissions of users of a particular cluster, each permission defining a level of access control for a particular computerized resource of the enterprise, and
   adjusting an existing set of permissions for a user of the particular cluster based on a comparison of the existing set of permissions to the consensus set of permissions.

12. A computer-implemented method of providing security to an enterprise, the method comprising:
   receiving, by processing circuitry, personal information belonging to users of the enterprise;
   providing, by the processing circuitry, lists of user identifiers based on user relationships defined by the personal information, the lists of user identifiers respectively identifying clusters of users of the enterprise; and
   electronically imposing, by the processing circuitry, security classes on the clusters of users of the enterprise based on the lists of user identifiers;
wherein receiving the personal information belonging to users of the enterprise includes:
   obtaining user data from electronic personal information managers operated by the users of the enterprise;
wherein providing the lists of user identifiers based on the user relationships defined by the personal information includes:
   identifying clusters of users from the user data obtained from the electronic personal information managers, and
   outputting the lists of user identifiers to reflect the clusters of users identified from the user data;
wherein the user data obtained from the electronic personal information managers includes meeting data processed by calendaring circuitry operated by the users of the enterprise;
wherein identifying the clusters of users from the user data includes:
   based on co-attendance information in the meeting data, generating a vertex-edge graph having vertexes and edges connecting the vertexes, each vertex representing a user of the enterprise and each edge representing a relationship between multiple users, and
   performing a set of pruning operations on the vertex-edge graph to derive the clusters of users;
wherein generating the vertex-edge graph includes providing, to each edge, a weight having a relationship strength value which is based on analytics performed on the co-attendance information in the meeting data; and
wherein performing the set of pruning operations on the vertex-edge graph includes identifying groups of vertexes based on the relationship strength value of the weight of each edge.

13. A computer-implemented method as in claim 12 wherein electronically imposing the security classes on the clusters of users of the enterprise based on the lists of user identifiers includes:
   identifying a consensus set of permissions based on collected permissions of users of a particular cluster, each permission defining a level of access control for a particular computerized resource of the enterprise, and
   adjusting an existing set of permissions for a user of the particular cluster based on a comparison of the existing set of permissions to the consensus set of permissions.

14. Electronic equipment, comprising:
memory; and
control circuitry coupled to the memory, the memory storing instructions which, when carried out by the control circuitry, cause the control circuitry to:
   receive personal information belonging to users of the enterprise;
   provide lists of user identifiers based on user relationships defined by the personal information, the lists of user identifiers respectively identifying clusters of users of the enterprise; and
   electronically impose security classes on the clusters of users of the enterprise based on the lists of user identifiers;
wherein the control circuitry, when receiving the personal information belonging to users of the enterprise, is constructed and arranged to:
   obtain user data from electronic personal information managers operated by the users of the enterprise;
wherein the control circuitry, when providing the lists of user identifiers based on the user relationships defined by the personal information, is constructed and arranged to:
   identify clusters of users from the user data obtained from the electronic personal information managers, and
   output the lists of user identifiers to reflect the clusters of users identified from the user data;
wherein the user data obtained from the electronic personal information managers includes meeting data processed by calendaring circuitry operated by the users of the enterprise;
wherein the control circuitry, when identifying the clusters of users from the user data, is constructed and arranged to:
   based on co-attendance information in the meeting data, generate a vertex-edge graph having vertexes and edges connecting the vertexes, each vertex representing a user of the enterprise and each edge representing a relationship between multiple users, and
   perform a set of pruning operations on the vertex-edge graph to derive the clusters of users;
wherein the control circuitry, when generating the vertex-edge graph, is constructed and arranged to:

provide, to each edge, a weight having a relationship strength value which is based on analytics performed on the co-attendance information in the meeting data; and wherein the control circuitry, when performing the set of pruning operations on the vertex-edge graph, is constructed and arranged to:

identify groups of vertexes based on the relationship strength value of the weight of each edge.

15. Electronic equipment as in claim 14 wherein the control circuitry, when electronically imposing the security classes on the clusters of users of the enterprise based on the lists of user identifiers, is constructed and arranged to:

identify a consensus set of permissions based on collected permissions of users of a particular cluster, each permission defining a level of access control for a particular computerized resource of the enterprise, and adjust an existing set of permissions for a user of the particular cluster based on a comparison of the existing set of permissions to the consensus set of permissions.

16. A computer program product having a non-transitory computer readable medium which stores a set of instructions to provide security to an enterprise, the set of instructions, when carried out by computerized circuitry, causing the computerized circuitry to perform a method of:

receiving personal information belonging to users of the enterprise;

providing lists of user identifiers based on user relationships defined by the personal information, the lists of user identifiers respectively identifying clusters of users of the enterprise; and imposing security classes on the clusters of users of the enterprise based on the lists of user identifiers;

wherein receiving the personal information belonging to users of the enterprise includes:

obtaining user data from electronic personal information managers operated by the users of the enterprise;

wherein providing the lists of user identifiers based on the user relationships defined by the personal information includes:

identifying clusters of users from the user data obtained from the electronic personal information managers, and outputting the lists of user identifiers to reflect the clusters of users identified from the user data;

wherein the user data obtained from the electronic personal information managers includes meeting data processed by calendaring circuitry operated by the users of the enterprise;

wherein identifying the clusters of users from the user data includes:

based on co-attendance information in the meeting data, generating a vertex-edge graph having vertexes and edges connecting the vertexes, each vertex representing a user of the enterprise and each edge representing a relationship between multiple users, and performing a set of pruning operations on the vertex-edge graph to derive the clusters of users;

wherein generating the vertex-edge graph includes providing, to each edge, a weight having a relationship strength value which is based on analytics performed on the co-attendance information in the meeting data; and wherein performing the set of pruning operations on the vertex-edge graph includes identifying groups of vertexes based on the relationship strength value of the weight of each edge.

17. A computer program product as in claim 16 wherein electronically imposing the security classes on the clusters of users of the enterprise based on the lists of user identifiers includes:

identifying a consensus set of permissions based on collected permissions of users of a particular cluster, each permission defining a level of access control for a particular computerized resource of the enterprise, and adjusting an existing set of permissions for a user of the particular cluster based on a comparison of the existing set of permissions to the consensus set of permissions.

18. A computer-implemented method of providing security to an enterprise, the method comprising:

receiving, by processing circuitry, personal information belonging to users of the enterprise;

providing, by the processing circuitry, lists of user identifiers based on user relationships defined by the personal information, the lists of user identifiers respectively identifying clusters of users of the enterprise; and electronically imposing, by the processing circuitry, security classes on the clusters of users of the enterprise based on the lists of user identifiers;

wherein receiving the personal information belonging to users of the enterprise includes:

obtaining user data from electronic personal information managers operated by the users of the enterprise;

wherein providing the lists of user identifiers based on the user relationships defined by the personal information includes:

identifying clusters of users from the user data obtained from the electronic personal information managers, and outputting the lists of user identifiers to reflect the clusters of users identified from the user data;

wherein the user data obtained from the electronic personal information managers includes (i) email communications processed by email circuitry operated by the users of the enterprise and (ii) meeting data processed by calendaring circuitry operated by the users of the enterprise;

wherein identifying the clusters of users from the user data includes:

based on (i) the email communications and (ii) co-attendance information in the meeting data, generating a vertex-edge graph having vertexes and edges connecting the vertexes, each vertex representing a user of the enterprise and each edge representing a relationship between multiple users, and performing a set of pruning operations on the vertex-edge graph to derive the clusters of users.

19. Electronic equipment, comprising:

memory; and control circuitry coupled to the memory, the memory storing instructions which, when carried out by the control circuitry, cause the control circuitry to:

receive personal information belonging to users of the enterprise;

provide lists of user identifiers based on user relationships defined by the personal information, the lists of user identifiers respectively identifying clusters of users of the enterprise; and electronically impose security classes on the clusters of users of the enterprise based on the lists of user identifiers;

wherein the control circuitry, when receiving the personal information belonging to users of the enterprise, is constructed and arranged to:

obtain user data from electronic personal information managers operated by the users of the enterprise;

wherein the control circuitry, when providing the lists of user identifiers based on the user relationships defined by the personal information, is constructed and arranged to:
 identify clusters of users from the user data obtained from the electronic personal information managers, and
 output the lists of user identifiers to reflect the clusters of users identified from the user data;
wherein the user data obtained from the electronic personal information managers includes (i) email communications processed by email circuitry operated by the users of the enterprise and (ii) meeting data processed by calendaring circuitry operated by the users of the enterprise; and
wherein the control circuitry, when identifying the clusters of users from the user data, is constructed and arranged to:
 based on (i) the email communications and (ii) co-attendance information in the meeting data, generate a vertex-edge graph having vertexes and edges connecting the vertexes, each vertex representing a user of the enterprise and each edge representing a relationship between multiple users, and
 perform a set of pruning operations on the vertex-edge graph to derive the clusters of users.

20. A computer program product having a non-transitory computer readable medium which stores a set of instructions to provide security to an enterprise, the set of instructions, when carried out by computerized circuitry, causing the computerized circuitry to perform a method of:
 receiving personal information belonging to users of the enterprise;
 providing lists of user identifiers based on user relationships defined by the personal information, the lists of user identifiers respectively identifying clusters of users of the enterprise; and
 imposing security classes on the clusters of users of the enterprise based on the lists of user identifiers;
wherein receiving the personal information belonging to users of the enterprise includes:
 obtaining user data from electronic personal information managers operated by the users of the enterprise;
wherein providing the lists of user identifiers based on the user relationships defined by the personal information includes:
 identifying clusters of users from the user data obtained from the electronic personal information managers, and
 outputting the lists of user identifiers to reflect the clusters of users identified from the user data;
wherein the user data obtained from the electronic personal information managers includes (i) email communications processed by email circuitry operated by the users of the enterprise and (ii) meeting data processed by calendaring circuitry operated by the users of the enterprise; and
wherein identifying the clusters of users from the user data includes:
 based on (i) the email communications and (ii) co-attendance information in the meeting data, generating a vertex-edge graph having vertexes and edges connecting the vertexes, each vertex representing a user of the enterprise and each edge representing a relationship between multiple users, and
 performing a set of pruning operations on the vertex-edge graph to derive the clusters of users.

* * * * *